United States Patent
Lee et al.

(10) Patent No.: US 10,070,435 B2
(45) Date of Patent: Sep. 4, 2018

(54) METHOD AND APPARATUS FOR JOINT RANDOM ACCESS CONTROL AND RESOURCE ALLOCATION IN WIRELESS COMMUNICATION SYSTEMS

(71) Applicant: RESEARCH & BUSINESS FOUNDATION SUNGKYUNKWAN UNIVERSITY, Suwon-si (KR)

(72) Inventors: Tae Jin Lee, Suwon-si (KR); Dong In Kim, Seongnam-si (KR); Chang Yeong Oh, Suwon-si (KR); Min Gyu Lee, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 240 days.

(21) Appl. No.: 15/048,190

(22) Filed: Feb. 19, 2016

(65) Prior Publication Data
US 2017/0099663 A1 Apr. 6, 2017

(30) Foreign Application Priority Data
Oct. 2, 2015 (KR) .................. 10-2015-0138993

(51) Int. Cl.
*H04W 72/04* (2009.01)
*H04W 4/70* (2018.01)
*H04W 74/08* (2009.01)

(52) U.S. Cl.
CPC ........ *H04W 72/0446* (2013.01); *H04W 4/70* (2018.02); *H04W 74/0833* (2013.01)

(58) Field of Classification Search
CPC ............. H04W 24/02; H04W 28/0215; H04W 28/0289; H04W 28/08; H04W 4/001;
(Continued)

(56) References Cited

U.S. PATENT DOCUMENTS

2011/0199905 A1 8/2011 Pinheiro et al.
2012/0033613 A1* 2/2012 Lin .................. H04W 74/085
370/328
(Continued)

FOREIGN PATENT DOCUMENTS

EP 2 365 678 A1 9/2011
KR 10-2011-0095138 A 8/2011
(Continued)

OTHER PUBLICATIONS

Korean Notice of Allowance dated Jan. 9, 2017 in counterpart Korean Application No. 10-2015-0138993. (5 pages in Korean).
(Continued)

*Primary Examiner* — Jamal Javaid
*Assistant Examiner* — Rose Clark
(74) *Attorney, Agent, or Firm* — NSIP Law

(57) ABSTRACT

The present disclosure relates to a method for joint random access control and resource allocation in a wireless communication system, and an apparatus using the same. A method for joint random access control and resource allocation in a wireless communication system includes estimating the total number of Machine Type Communication (MTC) devices, and determining at least one of an access control probability and an amount of resources to be allocated in a next frame depending on an amount of resources required to satisfy a random access delay requirement, by considering access control and resource allocation based on the total number of random access MTC devices.

18 Claims, 7 Drawing Sheets

(58) Field of Classification Search
CPC . H04W 4/005; H04W 48/02; H04W 72/0446; H04W 72/0486; H04W 72/0493; H04W 74/04; H04W 74/0833
See application file for complete search history.

(56) References Cited

U.S. PATENT DOCUMENTS

| | | | |
|---|---|---|---|
| 2013/0157653 A1* | 6/2013 | Huang | H04W 28/0215 455/423 |
| 2013/0265953 A1* | 10/2013 | Salkintzis | H04W 76/022 370/329 |
| 2014/0328258 A1 | 11/2014 | Cheng et al. | |
| 2016/0165378 A1* | 6/2016 | Harsha | H04W 4/005 370/329 |

FOREIGN PATENT DOCUMENTS

| | | |
|---|---|---|
| KR | 10-2013-0016222 A | 2/2013 |
| KR | 10-2013-0037382 A | 4/2013 |
| WO | WO 2013/051910 A2 | 4/2013 |

OTHER PUBLICATIONS

Oh, Chang-Yeong, et al. "Joint Access Control and Resource Allocation for Concurrent and Massive Access of M2M Devices." Wireless Communications, IEEE Transactions on 14.8 (Mar. 30, 2015): 4182-4192.
Korean Office Action dated Oct. 12, 2016 in counterpart Korean Application No. 10-2015-0138993. (4 pages in Korean).

\* cited by examiner

Algorithm 1 Proposed Optimal RAOs Allocation and Access Control Algorithm

---

1: // $L_i$: number of allocated RAOs in the $i$th frame
2: // $\tilde{L}_{idle,i}$: number of measured idle RAOs in the $i$th frame
3: // $p_{EAB,i}$: EAB probability in the $i$th frame
4: // $D_{req}$: minimum access delay requirement
5: // $L_{max}$: maximum number of RAOs in a frame
6: // $L_{init}$: number of RAOs for the initial frame
7: $L_1 = L_{init}$
8: $p_{EAB,1} = 1$
9: $i = 1$
10: for $i$th frame do
11:     // Estimation phase
12:     // Estimate the number of MTCDs trying to access
13:     Measure (count) $\tilde{L}_{idle,i}$
14:     Compute $\hat{p}_{idle,i}$ by Eq. (13)
15:     Estimate $\hat{C}_i$ by Eq. (14)
16:     Estimate $\hat{N}_i$ by Eq. (15)
17:     $\hat{N}_{i+1} = \hat{N}_i$
18:     // Access control and RAOs allocation phase
19:     // Decide the optimal access probability and the optimal number of RAOs for the next frame
20:     if $\hat{N}_{i+1} \leq L_{max}$ then
21:         Find $L_{i+1}$ and $p_{EAB,i+1}$ by Eq. (16)
22:     else
23:         Find $L_{i+1}$ and $p_{EAB,i+1}$ by Eq. (17)
24:     end if
25:     $i = i + 1$
26: end for

METHOD AND APPARATUS FOR JOINT RANDOM ACCESS CONTROL AND RESOURCE ALLOCATION IN WIRELESS COMMUNICATION SYSTEMS

CROSS-REFERENCE TO RELATED APPLICATION(S)

This application claims priority from Korean Patent Application No. 10-2015-0138993, filed on Oct. 2, 2015, in the Korean Intellectual Property Office, the entire disclosures of which are incorporated herein by reference for all purposes.

BACKGROUND OF THE INVENTION

Field of the Invention

The present disclosure relates to a technology for random access control and resources allocation in a wireless communication system.

Related Art

A next generation wireless communication system is expected to enable person-to-thing and thing-to-thing connection over a network through Machine-to-Machine (M2M) communication without human interruption. It is also expected that new services, such as smart grid or Internet of Things (IoT), can be introduced. In a new-generation network, a large number of Machine Type Communication (MTC) devices are expected to connect eNodeB and MTC devices employing energy harvesting would be introduced. Thus, to support communication between devices, there is need of a method for access control and random access resource allocation for a purpose of management of network loads.

The Third Generation Partnership Project (3GPP) which has led standardization of new generation cellular network technologies, has been making efforts to standardize MTC technologies. In order to deal with the surge of network loads occurring in a random access procedure due to access attempts made by numerous MTC devices, the 3GPP has standardized an Enhanced Access Barring (EAB) technology.

FIG. 1 shows a random access procedure in an existing wireless communication system. The random access procedure in the 3GPP standard includes four steps: preamble transmission, Random Access Response (RAR) transmission, scheduled transmission, and contention resolution. In the step for preamble transmission, an MTC device attempts a random access by transmitting a preamble to eNodeB. To transmit a preamble, an MTC device has to normally receive system information broadcasted by eNodeB. The system information broadcasted by eNodeB includes information for generating a preamble to be transmitted by the MTC device (that is, preamble generation information), and Physical Random Access Channel (PRACH) subframe configuration information. A preamble is based on Zadoff-Chu sequence, so root information required for generating Zadoff-Chu sequence is included in information for generating the preamble. The MTC device may generate up to 64 preambles. The PRACH subframe configuration information indicates a location of each subframe including a PRACH within a frame, and the number of such subframes. Up to 10 PRACH subframes may be configured in one frame based on the PRACH subframe configuration information.

The MTC device selects any one of available PRACH subframes based on the received PRACH subframe configuration information, randomly selects one preamble from the selected subframe based on preamble generation information, and transmits the selected preamble. In the step for RAR, the MTC device receives an RAR message from eNodeB. The RAR message includes Cell Radio Network Temporary Identities (C-RNTI) information, preamble identifier (ID), timing advance information, and uplink transmission resource allocation information. Uplink transmission resources are allocated for uplink transmission for a successfully received preamble. In a case where the RAR message includes preamble ID corresponding to the transmitted preamble, the MTC device determines that the transmitted preamble has been successfully detected by eNodeB, and performs the step of scheduled transmission. Alternatively, in a case where the RAR message does not include preamble ID corresponding to the transmitted preamble, the MTC device determines that it has failed in a random access procedure, and waits to re-perform the step of preamble transmission. In the step of scheduled transmission, the MTC device transmits a message through scheduled transmission based on the uplink resource allocation information included in the RAR message. If successfully receiving the message in the uplink resources, eNodeB transmits a contention resolution message. If the MTC device receives the contention resolution message, it determines that the random access procedure has succeeded. In a case where a plurality of MTC devices selects and transmits the same PRACH subframe and preamble, receives a RAR message, and perform scheduled transmission based on the received RAR message, there may be collision between messages transmitted in uplink resources, so that the corresponding MTC devices end up failing in the random access procedure.

The EAB technology is an access control technology for relieving network loads occurring in a random access procedure. That is, when multiple MTC devices perform random access procedure, the EAB technology aims at preventing an increase in a failure probability of a random access procedure in a case where a plurality MTC devices selects the same PRACH subframe and preamble. For access control of an MTC device based on the EAB technology, eNodeB broadcasts system information including an access barring factor which has a value between 0 and 1. When receiving the system information including an access barring factor, the MTC device selects a random value in a range between 0 and 1, and compare the selected value with the received access barring factor. In a case where the selected value is smaller than the access barring factor, the MTC device performs a random access procedure. Alternatively, in a case where the selected value is equal to or greater than the access barring factor, the MTC device waits without performing the random access procedure. By controlling probabilistically an access of an MTC device by means of an access barring factor EAB, eNodeB is capable of controlling the number of MTC devices participating in the random access procedure.

However, the related art does not provide a specific method for determining information of appropriate PRACH subframe constitution, preamble generation information, and an access barring factor. In order to maximize efficiency of random access resources while satisfying a delay requirement in various services, it is required to determine optimal PRACH subframe constitution information, preamble generation information, and an access barring factor.

A result of multiplication of the number of available PRACH subframes by the number of available preambles is a Random Access Opportunity (RAO) within one frame, and the RAO may determine the maximum number of MTC devices capable of succeeding in a random access procedure in one frame. In addition, the access barring factor may be used to appropriately control the number of MTC devices attempting a random access procedure. If the number of MTC devices attempting a random access procedure is not appropriate compared to the number of RAOs allocated by eNodeB, random access efficiency may be degraded, and, in turn, access delay of MTC devices may increase. Further, the degradation of random access efficiency results in an increase of attempts for random access of MTC devices, thereby leading to an increase in energy consumption. As a result, it may interrupt introduction of MTC devices, such as energy harvesting MTC devices, which are sensitive to energy consumption. Therefore, in order to maximize random access efficiency while satisfying a delay requirement, it need to consider a method for access control based on an access barring factor and a method for random access resource allocation together, which provides RAOs.

SUMMARY OF THE INVENTION

The present invention aims to provide a method for joint random access control and resource allocation in a wireless communication system for a purpose of maximizing random access efficiency while satisfying a random access delay requirement.

In one general aspect, there is provided a method for joint random access control and resource allocation in a wireless communication system, including: estimating the total number of random access Machine Type Communication (MTC) devices; and by considering access control and resource allocation based on the total number of random access MTC devices, determining at least one of an access control probability in a next frame and an amount of resources to be allocated in the next frame depending on an amount of resources required to satisfy a random access delay requirement.

The estimating of the total number of random access MTC devices may include: estimating the number of competitive MTC devices in a frame, which is the number of random access MTC devices allowable to access a current frame; and estimating the total number of random access MTC devices in the next frame based on the number of competitive MTC devices in the current frame and an access control probability used in the current frame.

The random access MTC devices may include: an MTC device newly attempting a random access in the current frame; an MTC device not establishing a random access in a previous frame due to an access control probability; and an MTC device failing in a random access in the previous frame.

The estimating the number of competitive MTC devices in the current frame may include: initializing parameters which include a delay time requirement, the maximum number of Random Access Opportunities (RAOs) capable of being allocated by a base station, and the default number of RAOs; setting the default number of RAOs and a default random access probability; estimating the number of RAOs having no received preamble among RAOs in the current frame; calculating a probability of occurrence of an RAO having no received preamble among the RAOs in the current frame; and estimating the number of competitive MTC devices in the current frame.

The estimating the total number of access MTC devices in the next frame may include: estimating the total number of random access MTC devices in the current frame, by considering the number of competitive MTC devices in the current frame and the probability of occurrence of an RAO having no received preamble among the RAOs in the current frame; and estimating the total number of random access MTC devices in the next frame, by considering the total number of random access MTC devices in the current frame.

The determining of at least one of an access control probability in the next frame and an amount of resources to be allocated in the next frame may include: depending on whether the total number of random access MTC devices in the next frame is smaller or greater than the maximum number of RAOs capable of being allocated by the base station, determining the number of RAOs in the next frame and an access control probability in the next frame; and broadcasting system information for the next frame, in which information corresponding to the number of RAOs in the next frame and the access control probability in the next frame is included.

The determining of at least one of an access control probability in the next frame and an amount of resources to be allocated in the next frame comprises: determining the at least one of the amount of resources to be allocated in the next frame and the access control probability in the next frame based on parameters which comprise the maximum number of RAOs capable of being allocated by the base station, the number of RAOs in the next frame, and the total number of random access MTC devices in the next frame.

The determining of at least one of an access control probability in the next frame and an amount of resources to be allocated in the next frame may include: determining the access control probability in the next frame to be 1 in a case where the total number of random access MTC devices in the next frame is smaller than or equal to the maximum number of RAOs capable of being allocated by the base station, wherein in a case where a set of number of RAOs satisfying an average random access delay requirement of a random access MTC device is a null set, the number of RAOs in the next frame is determined to be the total number of random access MTC devices in the next frame, and, in any other cases, the number of RAOs in the next frame is determined to be the number of RAOs maximizing random access efficiency in the next frame.

The determining of at least one of an access control probability in the next frame and an amount of resources to be allocated in the next frame may include: determining the number of RAOs in the next frame to be the maximum number of RAOs in a case where the total number of random access MTC devices in the next frame is greater than the maximum number of RAOs capable of being allocated by the base station, wherein in a case where a set of access control probabilities satisfying a random access delay requirement is a null set, the access control probability in the next frame is determined to be a ratio of the maximum number of RAOs to the total number of random access MTC devices in the next frame, and, in any other cases, the access control probability in the next frame is determined to be an access control probability maximizing random access efficiency in the next frame.

In one another general aspect, there is provided an apparatus for joint random access control and resource allocation in a wireless communication system, including: an estimator configured to estimate the total number of random access MTC devices; and a determiner configured to, by considering access control and resource allocation based on the total number of random access MTC devices, depending on an amount of resources required to satisfy a random access delay requirement, determine at least one of an access control probability in a next frame and an amount of resources to be allocated in the next frame.

The estimator may include: a first element configured to estimate the number of competitive MTC devices in a frame, which is the number of random access MTC devices allowable to access a current frame; and a second element configured to, based on the number of competitive MTC devices in the current frame and an access control probability used in the current frame, estimate the total number of random access MTC devices able to attempt a random access in a next frame.

The random access MTC devices may include: an MTC device newly attempting a random access in the current frame; an MTC device not establishing a random access in a previous frame due to an access control probability; and an MTC device failing in a random access in the previous frame.

The first element performs operations may include: initializing parameters which comprise a delay time requirement, the maximum number of Random Access Opportunities (RAOs) capable of being allocated by a base station, and the default number of RAOs; setting the default number of RAOs and a default random access probability; estimating the number of RAOs having no received preamble among RAOs in the current frame; calculating a probability of occurrence of an RAO having no received preamble among the RAOs in the current frame; and estimating the number of competitive MTC devices in the current frame.

The second element performs operations may include: estimating the total number of random access MTC devices in the current frame, by considering the number of competitive MTC devices in the current frame and the probability of occurrence of an RAO having no received preamble among the RAOs in the current frame; and estimating the total number of random access MTC devices in the next frame, by considering the total number of random access MTC devices in the current frame.

The determiner may include: a determination element configured to, depending on whether the total number of random access MTC devices in the next frame is smaller or greater than the maximum number of RAOs capable of being allocated by the base station, determine the number of RAOs in the next frame and an access control probability in the next frame; and a broadcast element configured to broadcast system information for the next frame, in which information corresponding to the number of RAOs in the next frame and the access control probability in the next frame is included.

The determination element may determine the at least one of the amount of resources to be allocated in the next frame and the access control probability in the next frame based on parameters which comprise the maximum number of RAOs capable of being allocated by the base station, the number of RAOs in the next frame, and the total number of random access MTC devices in the next frame.

In a case where the total number of random access MTC devices in the next frame is smaller than or equal to the maximum number of RAOs capable of being allocated by the base station, the determination element may determine the access control probability in the next frame to be 1, wherein in a case where a set of number of RAOs satisfying an average random access delay requirement of a random access MTC device is a null set, the determination element determines the number of RAOs in the next frame to be the total number of random access MTC devices in the next frame, while, in any other cases, the determination element determines the number of RAOs in the next frame to be the number of RAOs maximizing random access efficiency in the next frame.

In a case where the total number of random access MTC devices in the next frame is greater than the maximum number of RAOs capable of being allocated by the base station, the determination element may determine the number of RAOs in the next frame to be the maximum number of RAOs, wherein, in a case where a set of access control probabilities satisfying a random access delay requirement is a null set, the determination determines the access control probability in the next frame to be a ratio of the maximum number of RAOs to the total number of random access MTC devices in the next frame, and, in any other cases, the determination element determines the access control probability in the next frame to be an access control probability maximizing random access efficiency in the next frame.

The apparatus may further include a preamble receiver configured to receive a preamble from an MTC device.

The present disclosure considers both of a method for random access control and a method for resource allocation, so that random access resources may be dynamically allocated so as to maximize efficiency in a case where an amount of resources required to satisfy a random access delay requirement is smaller than the maximum amount of resources capable of being allocated, and an access control probability may be dynamically determined so as to maximize efficiency in a case where an amount of resources required to satisfy a random access delay requirement is greater than the maximum amount of resources available to be allocated

BRIEF DESCRIPTION OF THE DRAWINGS

FIG. 2 is an algorithm for dynamically determining the optimal number of RAOs and the optimal control probability according to a variable value N in an actual system.

DESCRIPTION OF EXEMPLARY EMBODIMENTS

Figure 1:
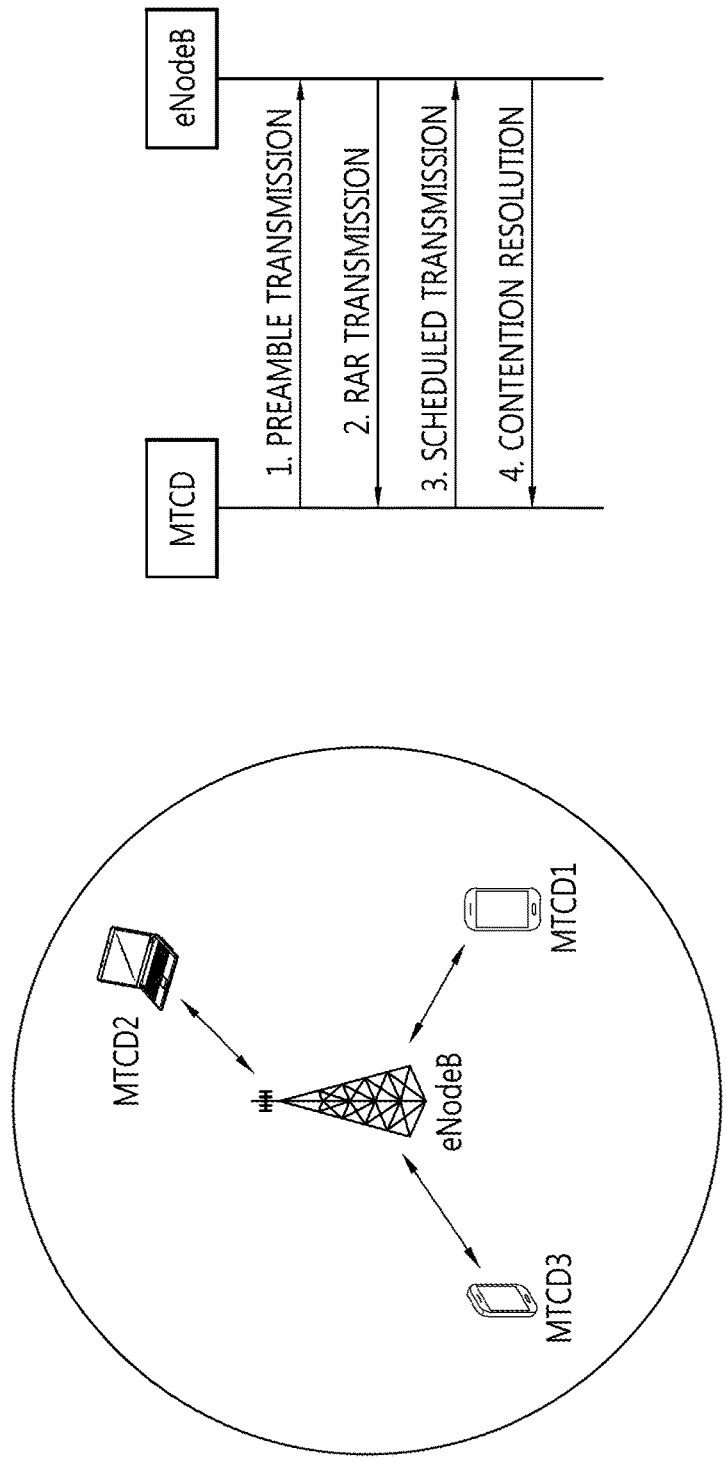
FIG. 1 shows a random access procedure in an existing wireless communication system.

The present invention may have various modifications and various embodiments, and specific embodiments thereof are illustrated in the drawings and described in the detailed description. However, it is not an attempt to limit the present invention to the specific embodiments, and it should be understood that the present invention covers all the modifications, equivalents, and replacements within the idea and technical scope of the present invention.

Numbers (for example, first and second) used in the description of this specification are just identification symbols for distinguishing one component from another component. For example, within the scope of the claims of the present invention, a first constitution element may be called a second constitution element. Similarly, the second constitution element may be called the first constitution element.

The term "and/or" includes a combination of a plurality of relevant items or any one of a plurality of relevant items.

It is understood that when one element or component is described as being "connected to" or "coupled to" or "access" another element or component, it can be directly connected or coupled to, or access the other element or component, or intervening elements or components may be present. Alternatively, it is understood that when one element or component is described as being "connected directly to" or "coupled directly to" or "access directly" another element or component, there is no intervening elements or components.

Terms used in the specification are used only for describing specific embodiments, not for limiting the present invention. A singular expression includes a plural expression unless the context clearly indicates otherwise. In the present invention, it is further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The meanings of technical, scientific, and any terms used in the present invention are the same as general meanings thereof which are obvious to one of ordinary skill in the art to which the present invention pertains, unless the present invention defines different meanings of the terms. Ordinary dictionary-defined terms are interpreted to have the meaning conforming to the context of a related technology, and are not interpreted ideally or unduly formally, unless the terms are clearly defined with different meanings in the specification.

Hereinafter, embodiments of the present invention are described in more detail with reference to the accompanying drawings. Like reference numerals refer to like elements regardless of drawing numbers in order to facilitate a thorough understanding.

The present invention explains technical characteristics with an example of a random access procedure in a Long Term Evolution-Advanced (LTE-A) system employing a Frequency Division Duplexing (FDD) mode. However, it is merely an example of a system to which the present invention is able to be applied, and the present invention may be applied to various wireless communication systems employing MTC and requiring a random access procedure. For example, the present disclosure is applicable in a range from the second generation (2G) to the fifth generation (5G) communication systems and a Wireless Local Area Network (WLAN). In addition, the present invention is applicable to any other next generation mobile communications and other wired/wireless communications to which the technical idea of the present invention may be applied. Throughout the present disclosure, the term "base station" may include a fixed station, Node B, eNodeB (eNB), and an Access Point (AP).

A LTE-A system operates in units of T ms frame, and each frame consists of $N_{sub}$ number of subframes. Thus, length of each subframe is $T/N_{sub}$. RAOs in any frame are determined depending on the number of PRACH subframes and the number of preambles used in a single frame for random access. The number of PRACH subframes to be allocated to one frame may be changed in a range of 0.5, 1, 2, 3, 5, and 10. The maximum number of preambles is 64, and $N_{preamble}$ number of preambles is used in a single frame.

Among MTC devices existing in a cell, an MTC device attempting a random access refers to a random access MTC device. A random access MTC device in a frame may include MTC devices which perform new random access in the current frame, MTC devices which did not perform random access in a previous frame due to access control probabilities, and MTC devices which failed to perform random access in the previous frame. Among random access MTC devices, an MTC device for which random access is allowed due to an access control probability refers to a competitive MTC device, and an MTC device for which random access is not allowed refers to a non-competitive MTC device. An MTC device for which random access is succeeded in any frame refers to a successful MTC device. An MTC device for which random access is succeeded does not re-attempt random access.

In the assumption that the total number of random access MTC devices is N, the present invention describes a method for determining the optimal number of RAOs and the optimal access control probability, and an algorithm for dynamically determining the optimal number of RAOs and the optimal access control probability according to N total number of random access MTC devices in a base station of a LTE-A system.

In the present invention, random access efficiency indicates a ratio of the number of RAOs used for successful random access to the total number of RAOs. If random access efficiency is $R_{eff}$, it may be represented as in [Equation 1] as below:

$$R_{eff} = C \cdot \left(\frac{1}{L}\right)\left(1 - \frac{1}{L}\right)^{C-1} \quad \text{[Equation 1]}$$

where C denotes the number of competitive MTC device in any frame, and L denotes RAOs.

In the present invention, the number of RAOs for satisfying a random access delay requirement and maximizing $R_{eff}$ may be determined. An operation for determining the optimal number of RAOs may be represented by [Equation 2] as below:

$$\max_L R_{eff} = \max_L C \cdot \left(\frac{1}{L}\right)\left(1 - \frac{1}{L}\right)^{C-1} \quad \text{[Equation 2]}$$
$$\text{s.t. } C1: L \in L_{set}$$
$$C2: \mathbb{E}[D] \leq D_{req}$$

where $L_{set}$ denotes the set of numbers of available RAOs, D denotes random access delay of a random access MTC device, E[D] denotes average random access delay of a random access MTC device, and $D_{req}$ denotes the random access delay requirement.

In a case where the maximum value of $L_{set}$ is $L_{max}$, in order to maintain $R_{eff}$ efficiently, it is necessary to minimize the number of random access MTC devices other than newly random access attempting MTC devices in the entire random access MTC devices. Hereinafter, a case where $N \leq L_{max}$ and a case where $N > L_{max}$ are provided to describe a method for determining the optimal number of RAOs and the optimal access control probability, wherein N is the total number of random access MTC devices.

If $N \leq L_{max}$, the number of RAOs is big enough to accommodate the entire random access MTC devices, so that an access control probability may be determined to be 1. Thus, there is need of a method for dynamically determining the optimal number of RAOs according to the total number of random access MTC devices.

The optimal number of RAOs should satisfy a random access delay requirement. For this reason, a set of numbers of RAOs needs to be determined first, and then the number of RAOs maximizing $R_{\mathit{eff}}$ in the set of numbers of RAOs is determined to be the optimal number of RAOs.

E[D] may be calculated as in [Equation 3], as below:

$$\mathbb{E}[D] = \sum_{r=0}^{\infty} T \cdot (r+1) \cdot p_{access} \cdot (1 - p_{access})^r = \frac{T}{p_{access}} \quad \text{[Equation 3]}$$

where $p_{access}$ denotes the probability of any random access MTC device to become a successful MTC device when attempting a random access based on an access control probability.

In addition, $p_{access}$ is defined as in [Equation 4], as below:

$$p_{access} = p_{EAB} \cdot p_{succ} \quad \text{[Equation 4]}$$

where $p_{EAB}$ denotes the access control probability, and $p_{succ}$ denotes the probability of any random access MTC device to succeed in a random access in a case where the number of RAOs is L.

In addition, $p_{succ}$ is defined as in [Equation 5], as below:

$$p_{access} = L \cdot \left(\frac{1}{L}\right)\left(1 - \frac{1}{L}\right)^{C-1} = \left(1 - \frac{1}{L}\right)^{C-1} \quad \text{[Equation 5]}$$

Through [Equation 3], a relation between E[D] and $D_{req}$ may be represented as in [Equation 6] as below:

$$\mathbb{E}[D] = \frac{T}{p_{access}} = \frac{T}{p_{EAB} \cdot p_{succ}} \leq D_{req} \quad \text{[Equation 6]}$$

Thus, the set of numbers of RAOs satisfying E[D], may be represented as in [Equation 7] as below:

$$\Lambda = \left\{ L \,\Big|\, \frac{T}{\left(1 - \frac{1}{L}\right)^{C-1}} \leq D_{req}, L \in L_{set} \right\} \quad \text{[Equation 7]}$$

In a case where the optimal number of RAOs is L*, L* may be represented as in [Equation 8] as below:

$$L^* = \underset{L \in \Lambda}{\mathrm{argmax}} R_{\mathit{eff}} \quad \text{[Equation 8]}$$

If the set of number of RAOs is a null set, it is not possible to obtain the solution of [Equation 2]. In this case, for a purpose of the maximum random access efficiency, the optimal number of RAOs may be determined to be equal to C which denotes an average number of competitive MTC devices, but a random access delay requirement may not be satisfied. The average number of competitive MTC devices in any frame may be calculated as shown in [Equation 9], as below:

$$C = p_{EAB} \cdot N \quad \text{[Equation 9]}$$

If $N > L_{max}$, the number of RAOs are not capable of accommodating the total number of random access MTC devices, and thus, the number of RAOs may be determined to be $L_{max}$. Thus, there is need of a method for dynamically determining the optimal access control probability according to the total number of random access MTC devices.

The optimal access control probability should satisfy a random access delay requirement. For this reason, a set of access control probabilities satisfying the random access delay requirement is determined first, and then an access control probability maximizing $R_{\mathit{eff}}$ among the set of access control probabilities is determined to be the optimal access control probability.

In a case where P indicates the set of access control probabilities satisfying a random access delay requirement, P may be represented as shown in [Equation 10], as below:

$$P = \left\{ p_{EAB} \,\Bigg|\, \frac{T}{p_{EAB} \cdot \left(1 - \frac{1}{L_{max}}\right)^{p_{EAB} \cdot N - 1}} \leq D_{req}, 0 < p_{EAB} \leq 1 \right\} \quad \text{[Equation 10]}$$

In a case where $p^*_{EAB}$ indicates an optimal access control probability, $p^*_{EAB}$ may be represented as shown in [Equation 11], as below:

$$p^*_{EAB} = \underset{p_{EAB} \in P}{\mathrm{argmax}} R_{\mathit{eff}} \quad \text{[Equation 11]}$$

If the set of access control probabilities is a null set, it is not possible to obtain the solution of [Equation 2]. In this case, to obtain the maximum random access efficiency, $p^*_{EAB}$ may be obtained as shown in [Equation 12], but a random access delay requirement may not be satisfied.

$$p^*_{EAB} = \frac{L_{max}}{N} \quad \text{[Equation 12]}$$

Method for Joint Random Access Control and Resource Allocation in Wireless Communication Systems.

Hereinafter, with reference to FIGS. 2, 3A, and 3B, there are provided descriptions about an algorithm for dynamically determining the optimal number of RAOs and the optimal access control probability according to changeable N, wherein the algorithm is included in a method for joint random access control and resource allocation in a real wireless communication system. In a real system, N is changed, and thus it is necessary to estimate a value of N, and the optimal number of RAOs and an optimal access control probability need to be determined relative to the estimated value of N.

The algorithm shown in FIG. 2 includes a step of estimating the total number of random access MTC devices and a step of determining at least one of the optimal access control probability in the next frame and the optimal amount of resources to be allocated. The step of estimating the total number of random access MTC devices includes estimating the number of competitive MTC devices in the current frame and estimating the total number of random access MTC devices.

Hereinafter, descriptions are provided with reference to FIGS. 2, 3A, and 3B. FIGS. 3A and 3B show operations for random access control and resource allocation by a base station.

$L_i$, $\tilde{L}_{idle,i}$, $p_{EAB,i}$, $D_{req}$, $L_{max}$, and $L_{init}$ are respectively defined on line 1 to 6 in FIG. 2. $L_i$ denotes the number of RAOs in the i-th frame, $\tilde{L}_{idle,i}$, denotes the number of idle RAOs having no received preamble in the i-th frame, $p_{EAB,i}$ denotes the access control probability in the i-th frame, $D_{reg}$ denotes the delay time requirement, $L_{max}$ denotes the maximum value indicating the number of RAOs able to be allocated by a base station, and $L_{init}$ denotes the initial value indicating the number of RAOs capable of being allocated by the base station. In S1 in FIG. 3A, initialization operations for $D_{reg}$, $L_{max}$, and $L_{init}$ are performed.

Figure 3A:
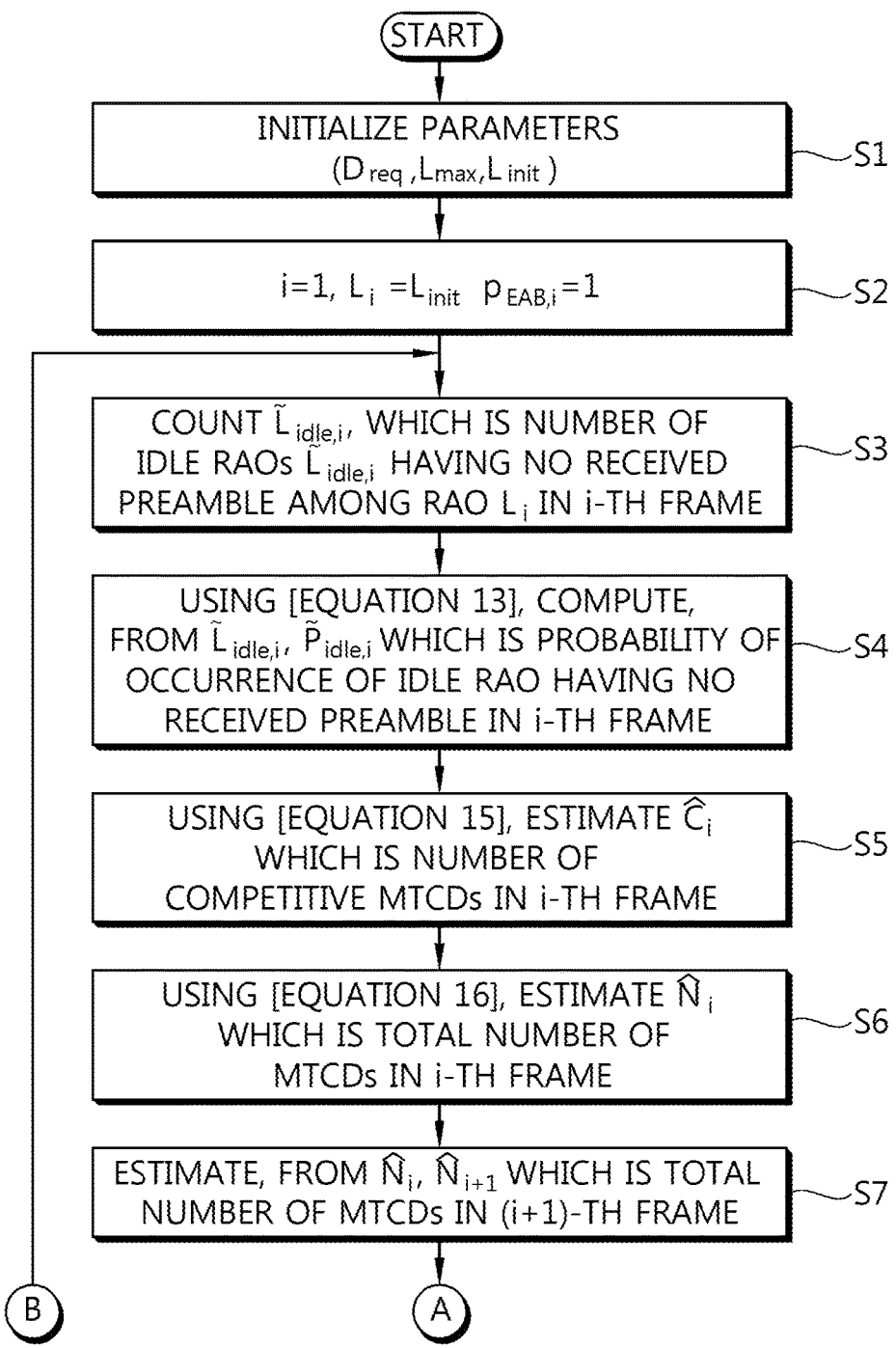
FIGS. 3A and 3B show operations for random access control and resource allocation by a base station according to an exemplary embodiment of the present invention.

Line 7 to 9 in FIG. 2 and S2 in FIG. 3A are a step of setting the number of RAOs and the random access probability when i is 1 (initial value setting step), and $p_{EAB,i}$ is set as 1, $L_{init}$ is set as 1 and i is set as 1, respectively.

Figure 3B:
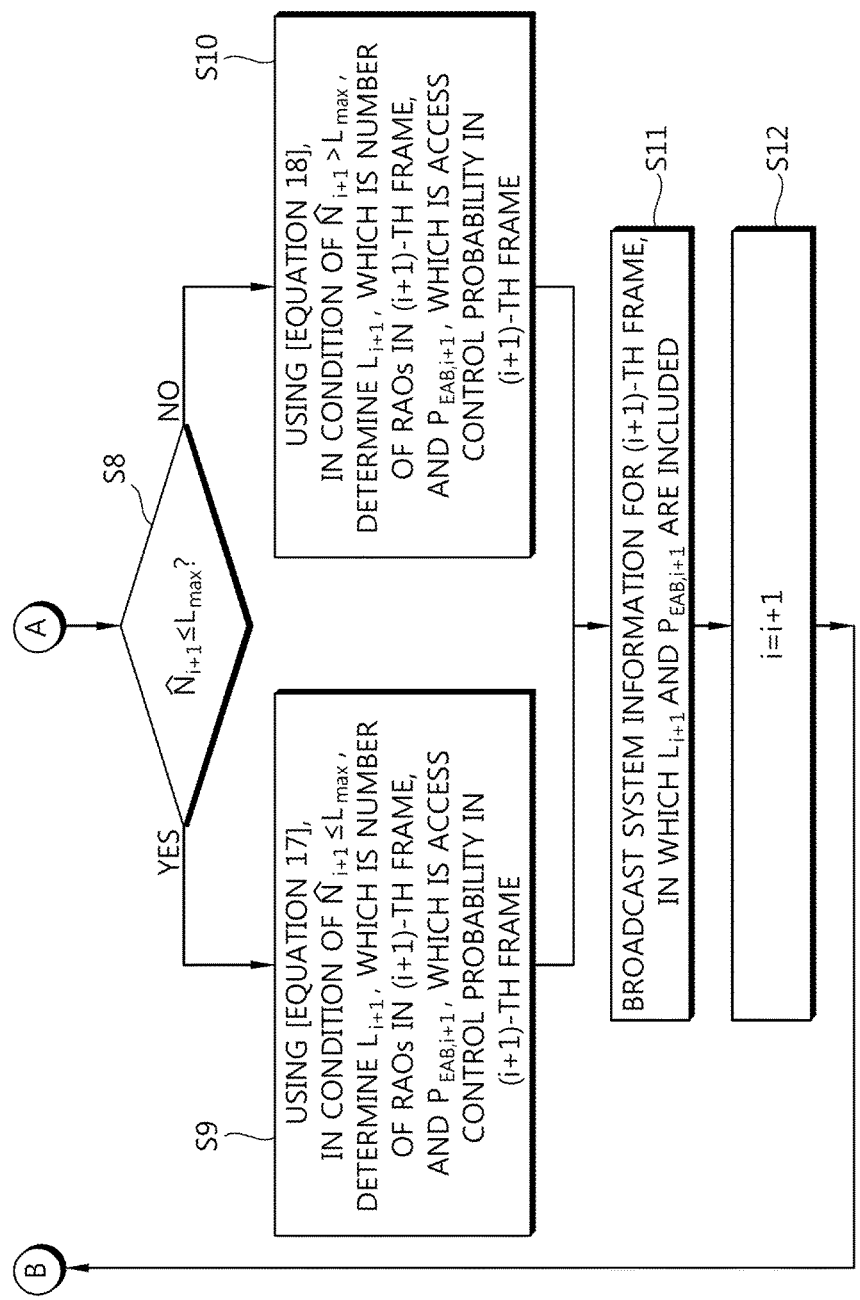
Figure 4:
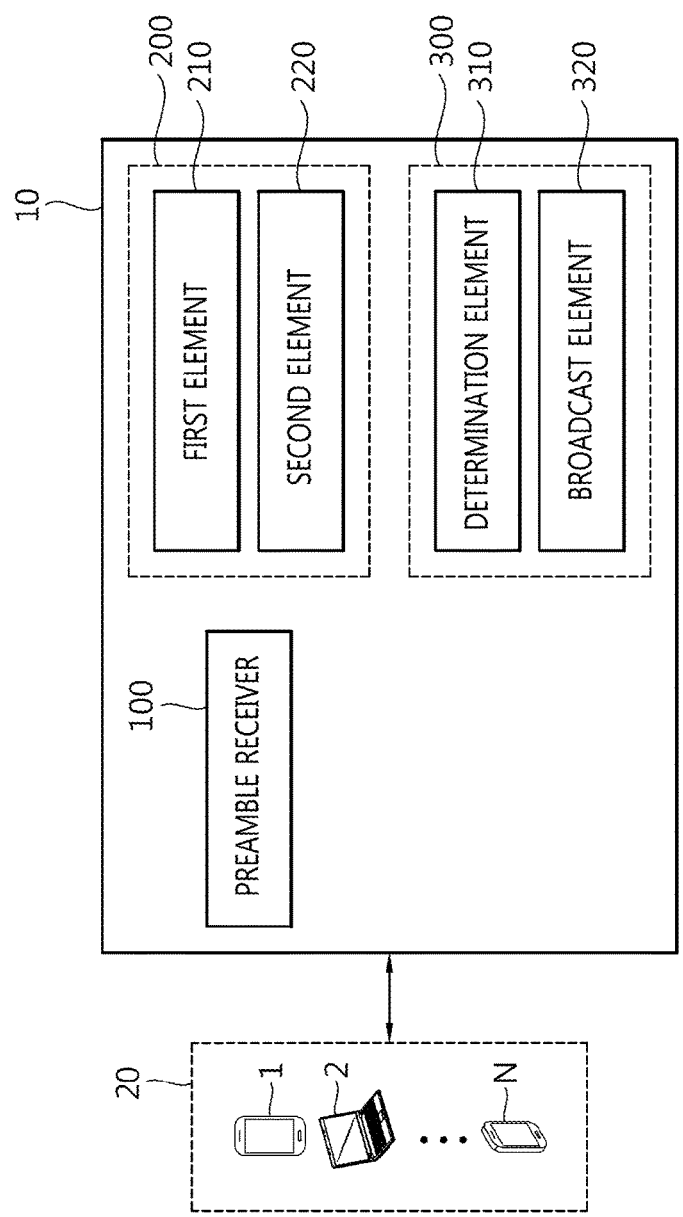
FIG. 4 is a schematic diagram illustrating an apparatus for joint random access control and resource allocations in a wireless communication system according to an exemplary embodiment of the present invention.

Operations regarding line 10 to 26 in FIG. 2 and S3 to S12 in FIGS. 3A and 3B are performed repetitively. Lines 11 to 17 in FIG. 2 and steps S3, S4, S5, S6 and S7 in FIG. 3A indicate a step of estimating the total number of random access MTC devices, correspond to a step of estimating the number of competitive MTC devices attempting a random access in the current frame and the total number of random access MTC devices. Regarding line 13 in FIG. 2 and S3 in FIG. 3A, a base station counts $\tilde{L}_{idle,i}$, which is the number of idle RAOs having no received preamble, in $L_i$ which is the number of RAOs in the i-th frame. Regarding line 14 in FIG. 2 and S4 in FIG. 3A, the base station computes $\tilde{p}_{idle,i}$ from the counted value $\tilde{L}_{idle,i}$, wherein $\tilde{p}_{idle,i}$ indicates the probability of occurrence of idle RAO having no received preamble. $\tilde{p}_{idle,i}$ may be calculated from $\tilde{L}_{idle,i}$, as shown in [Equation 13], as below:

$$\tilde{p}_{idle,i} = \frac{\tilde{L}_{idle,i}}{L_i} \qquad \text{[Equation 13]}$$

The idle RAO probability may be determined as shown in [Equation 14], as below:

$$p_{idle,i} = \left(1 - \frac{1}{L_i}\right)^{C_i} \qquad \text{[Equation 14]}$$

In a case where the number of competitive MTC devices in the i-th frame is $\hat{C}_i$, $\hat{C}_i$ may be estimated on line 15 in FIG. 2 and in S5 in FIG. 3A by letting $\tilde{p}_{idle,i} = \tilde{p}_{idle,i}$. $\hat{C}_i$ may be represented by [Equation 15], as below:

$$\hat{C}_i = \frac{\log(\tilde{p}_{idle,i})}{\log\left(\frac{L_i - 1}{L_i}\right)} \qquad \text{[Equation 15]}$$

In the step of estimating the total number of random access MTC devices, if the access control probability in the i-th frame is $p_{EAB,i}$ the total number of random access MTC devices in the i-th frame is estimated from $p_{EAB,i}$ and the number of competitive MTC devices in a frame, the number being estimated in [Equation 15]. Regarding line 16 in FIG. 2 and S6 in FIG. 3A, $\hat{N}_t$ which is the total number of random access MTC devices in the i-th frame, and $\hat{N}_t$ may be represented by [Equation 16], as below:

$$\hat{N}_I = \frac{1}{p_{EAB,i}} \cdot \hat{C}_i \qquad \text{[Equation 16]}$$

Regarding line 17 in FIG. 2 and S7 in FIG. 3A, $\hat{N}_{i+1}$ which is the total number of MTC devices in the (i+1)-th frame is calculated.

Line 18 to 24 in FIG. 2 and S8 to S11 in FIG. 3B correspond to a step of determining at least one of the optimal access control probability in the next frame and the optimal amount of resources to be allocated. In this step, if random access efficiency is $R_{eff,i+1}$, the optimal access control probability in the (i+1)-th frame and the optimal number of allocated RAOs, both of which are capable of guaranteeing $D_{req}$ and maximizing $R_{eff,i+1}$, are determined. The optimal access control probability in the (i+1)-th frame is defined as $p_{EAB,i+1}$, and the number of RAOs in the (i+1)-th frame is defined as $L_{i+1}$. Regarding line 20 in FIG. 2 and in S8 in FIG. 3B, it is determined whether $\hat{N}_{i+1}$ estimated through the estimating step is smaller than or equal to $L_{max}$.

Regarding line 21 in FIG. 2 and S9 in FIG. 3B, the set of numbers of available RAOs in the (i+1)-th frame is defined as $L_{set,i+1}$, and the set of number of RAOs satisfying E[D] is defined as $\Lambda_{i+1}$. In a case where $\hat{N}_{i+1}$ is smaller than or equal to $L_{max}$, $R_{eff,i+1}$ and $\Lambda_{i+1}$ are defined in [Equation 1] and [Equation 7] where $C=\hat{N}_{i+1}$, $L=L_{i+1}$, $L_{set}=L_{set,i+1}$, and $\Lambda=\Lambda_{i+1}$, and then the optimal values of $p_{EAB,i+1}$ and $L_{i+1}$ are calculated. $p_{EAB,i+1}$ and $L_{i+1}$ may be represented by [Equation 17].

$$p_{EAB,i+1} = 1, \qquad \text{[Equation 17]}$$

$$L_{i+1} = \begin{cases} \underset{L \in \Lambda_{i+1}}{\mathrm{argmax}} R_{eff,i+1}, & \Lambda_{i+1} \neq \phi, \\ \hat{N}_{i+1}, & \Lambda_{i+1} = \phi. \end{cases}$$

On line 23 in FIG. 2 and in S10 in FIG. 3B, in a case where $\hat{N}_{i+1}$ is greater than $L_{max}$, $p_{EAB,i+1}$ and $L_{i+1}$ are calculated using [Equation 1], where $C=p_{EAB,i+1}\hat{N}_{i+1}$ and $L=L_{max}$, and [Equation 10] where $p_{EAB}=p_{EAB,i+1}$, $N=\hat{N}_{i+1}$, and $P=P_{i+1}$. $p_{EAB,i+1}$ and $L_{i+1}$ may be represented by [Equation 18].

$$p_{EAB,i+1} = \begin{cases} \underset{p_{EAB} \in P_{i+1}}{\mathrm{argmax}} R_{eff,i+1}, & P_{i+1} \neq \phi, \\ \frac{L_{max}}{\hat{N}_{i+1}} & P_{i+1} = \phi. \end{cases} \qquad \text{[Equation 18]}$$

$$L_{i+1} = L_{max}.$$

In S11 in FIG. 3B, a base station broadcasts, to an MTC device, system information for the (i+1)-th frame, in which an access control probability corresponding to $L_{i+1}$ and $p_{EAB,i+1}$ and information on an amount of resources to be allocated corresponding to the same are included. On line 25 in FIG. 2 and in S12 in FIG. 3B, a value of i is updated in order to perform operations described in line 11 to 24 in FIG. 2 and S3 to S11 in FIGS. 3A and 3B with respect to the (i+1)-th frame.

Hereinafter, there are provided descriptions about an apparatus which employs the above-described method for random access control and resource allocation.

Apparatus for Joint Random Access Control and Resource Allocation in Wireless Communication Systems An apparatus 10 for dynamic random access control and resource allocation in a wireless communication system includes an estimator 200 for estimating the number of MTC devices, and a determiner 300 for determining an access control probability and an amount of resources to be allocated. In addition, the apparatus may further include a preamble receiver 100.

The estimator 200 may include a first element 210 and a second element 220. The first element 210 estimates the number of competitive MTC devices, that is, the number of random access MTC devices which attempt an access in the current frame. Based on the estimated number of competitive MTC devices and the access control probability used in the current frame, the second element 220 estimates the total number of random access MTC devices able to attempt random access in a next frame.

The first element 210 is configured to initialize parameters, to set default values, to estimate the number of idle RAOs having no received preamble among RAOs in the current frame, to calculate the probability of occurrence of an idle RAO having no received preamble among RAOs in the current frame, and to estimate the number of competitive MTC devices in the current frame.

Based on the above-estimated number of competitive MTC devices in the current frame and the above-calculated probability of occurrence of an idle RAO having no received preamble among RAOs in the current frame, the second element 220 is configured to estimate the total number of random access MTC devices in the current frame. In addition, based on the total number of random access MTC devices in the current frame, the second element 220 estimates the total number of random access MTC devices.

The determiner 300 may include a determination element 310 and a broadcast element 320. The determination element 310 is configured to determine the number of RAOs and an access control probability in a next frame depending on whether the total number of random access MTC devices in the next frame is smaller or greater than the maximum number of RAOs capable to be allocated by a base station. The broadcast element 320 is configured to broadcast system information for the next frame, in which information corresponding to the number of RAOs in the next frame and the access control probabilities in the next frame is included.

Example of Experiments

Hereinafter, improvement in performance of the present invention is provided with a simulation result. The experiment is performed in units of frame (10 msec), where the maximum number of random access MTC devices is 5000, $D_{req}$ is 60 msec, and the maximum number of RAOs is 540. In a related art, when a fixed number of RAOs is used, the number is 540. The experiments are divided into two cases: a case where an estimated number of MTC devices is always equal to an actual number of random access MTC devices, and a case which is based on an estimating procedure (est.) of an algorithm in the present invention. It is assumed that the arrival of new MTC devices follows a Poisson point process with rate λ.

Figure 5:
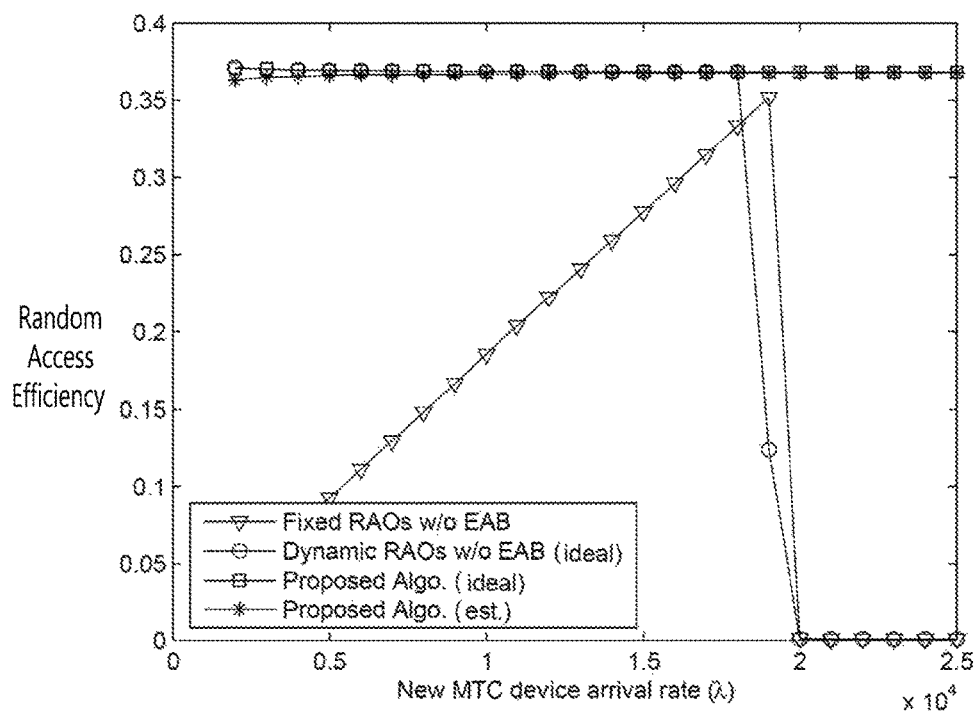
FIG. 5 is a graph illustrating comparison in performance of random access efficiency between a related art and the present invention.
Figure 6:
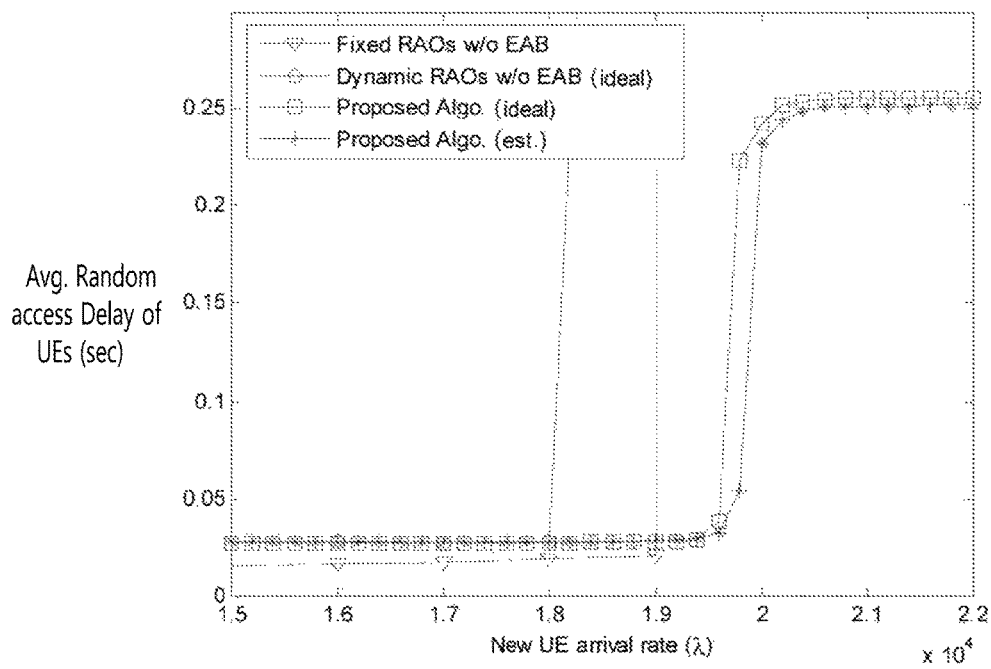
FIG. 6 is a graph illustrating comparison in access delay between a related art and the present invention.

FIG. 5 shows performance in random access efficiency according to a related art and the present invention, and FIG. 6 shows access delay performance according to a related art and the present invention. In FIG. 5 and FIG. 6, it can be found that performance achieved based on the estimation procedure of the algorithm in the present invention is very similar to the ideal case. In addition, it is also found that the random access efficiency performance and the delay time performance of the present invention show improvement, compared to those of the related art.

Referring to FIG. 5, in a fixed random access opportunity scheme not using EAB, random access efficiency increases in proportion to the number of random access MTC devices but dramatically decreases if the number of random access MTC devices reaches a threshold value. In a dynamic RAO scheme not using EAB, random access efficiency remains constant but dramatically decreases if the number of random access MTC devices reaches a threshold value. In the present invention, if EAB is used, the flexible number of RAOs is used according to the number of random access MTC devices, so that random access efficiency remains constant regardless of increase and decrease in the number of random access MTC devices.

Referring to FIG. 6, in the case of the fixed RAO scheme using EAB and the dynamic RAO scheme not using EAB, access delay time dramatically increase if the number of random access MTC devices is equal to or greater than a threshold value. EAB is used in the present invention, and the flexible number of RAOs is used according to the number of random access MTC devices. Therefore, it is possible to satisfy a delay requirement of 60 msec even in a case where there are random access MTC devices more than a related art.

In the above exemplary embodiments, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for joint random access control and resource allocation in a wireless communication system for optimization of random access efficiency of the wireless communication system, the method comprising:
    estimating, based on a calculated probability of occurrence of idle devices in a current frame, a number of competitive devices attempting access in the current frame;
    estimating a total number of random access devices in a next frame based on the estimated number of competitive devices in the current frame and an access control probability used in the current frame; and
    by considering access control and resource allocation based on the estimated total number of random access devices, determining at least one of an access control probability in the next frame and an amount of resources to be allocated in the next frame depending on an amount of resources required to satisfy a random access delay requirement.

2. The method of claim 1, wherein the random access devices comprise:

a machine type communication (MTC) device newly attempting a random access in the current frame;

an MTC device not establishing a random access in a previous frame due to an access control probability; and an MTC device failing in a random access in the previous frame.

3. The method of claim 2, wherein the estimating the number of competitive MTC devices in the current frame comprises:

initializing parameters which include a delay time requirement, a maximum number of Random Access Opportunities (RAOs) capable of being allocated by a base station, and the default number of RAOs;

setting the default number of RAOs and a default random access probability;

estimating a number of RAOs having no received preamble among RAOs in the current frame; and calculating a probability of occurrence of an RAO having no received preamble among the RAOs in the current frame.

4. The method of claim 3, wherein the estimating the total number of access MTC devices in the next frame comprises:

estimating the total number of random access MTC devices in the current frame, by considering the number of competitive MTC devices in the current frame and the probability of occurrence of an RAO having no received preamble among the RAOs in the current frame; and estimating the total number of random access MTC devices in the next frame, by considering the total number of random access MTC devices in the current frame.

5. The method of claim 4, wherein the determining of at least one of an access control probability in the next frame and an amount of resources to be allocated in the next frame comprises:

depending on whether the total number of random access MTC devices in the next frame is smaller or greater than the maximum number of RAOs capable of being allocated by the base station, determining the number of RAOs in the next frame and an access control probability in the next frame; and broadcasting system information for the next frame, in which information corresponding to the number of RAOs in the next frame and the access control probability in the next frame is included.

6. The method of claim 5, wherein the determining of at least one of an access control probability in the next frame and an amount of resources to be allocated in the next frame comprises:

determining the at least one of the amount of resources to be allocated in the next frame and the access control probability in the next frame based on parameters which comprise the maximum number of RAOs capable of being allocated by the base station, the number of RAOs in the next frame, and the total number of random access MTC devices in the next frame.

7. The method of claim 6, wherein the determining of at least one of an access control probability in the next frame and an amount of resources to be allocated in the next frame comprises:

determining the access control probability in the next frame to be 1 in a case where the total number of random access MTC devices in the next frame is smaller than or equal to the maximum number of RAOs capable of being allocated by the base station, and wherein, in a case where a set of number of RAOs satisfying an average random access delay requirement of a random access MTC device is a null set, the number of RAOs in the next frame is determined to be the total number of random access MTC devices in the next frame, and, in any other cases, the number of RAOs in the next frame is determined to be the number of RAOs maximizing random access efficiency in the next frame.

8. The method of claim 6, wherein the determining of at least one of an access control probability in the next frame and an amount of resources to be allocated in the next frame comprises:

determining the number of RAOs in the next frame to be the maximum number of RAOs in a case where the total number of random access MTC devices in the next frame is greater than the maximum number of RAOs capable of being allocated by the base station, and wherein, in a case where a set of access control probabilities satisfying a random access delay requirement is a null set, the access control probability in the next frame is determined to be a ratio of the maximum number of RAOs to the total number of random access MTC devices in the next frame, and, in any other cases, the access control probability in the next frame is determined to be an access control probability maximizing random access efficiency in the next frame.

9. An apparatus for dynamic joint random access control and resource allocation in a wireless communication system for optimization of random access efficiency of the wireless communication system, comprising:

a processor configured to:

estimate, based on a calculated probability of occurrence of idle devices in a current frame, a number of competitive devices attempting access in the current frame;

estimate a total number of random access devices in a next frame based on the estimated number of competitive devices in the current frame and an access control probability used in the current frame; and by considering access control and resource allocation based on the estimated total number of random access devices, depending on an amount of resources required to satisfy a random access delay request, determine at least one of an access control probability in the next frame and an amount of resources to be allocated in the next frame.

10. The apparatus of claim 9, wherein the random access devices comprises:

a machine type communication (MTC) device newly attempting a random access in the current frame;

an MTC device not establishing a random access in a previous frame due to an access control probability; and an MTC device failing in a random access in the previous frame.

11. The apparatus of claim 10, wherein the processor performs operations comprising:

initializing parameters which comprise a delay time requirement, the maximum number of RAOs capable of being allocated by a base station, and the default number of RAOs;

setting the default number of RAOs and a default random access probability;

estimating the number of RAOs having no received preamble among RAOs in the current frame; and calculating a probability of occurrence of an RAO having no received preamble among the RAOs in the current frame.

12. The apparatus of claim 11, wherein the processor is further configured to:
estimate the total number of random access MTC devices in the current frame, by considering the number of competitive MTC devices in the current frame and the probability of occurrence of an RAO having no received preamble among the RAOs in the current frame; and
estimate the total number of random access MTC devices in the next frame, by considering the total number of random access MTC devices in the current frame.

13. The apparatus of claim 12, wherein the processor is further configured to:
depending on whether the total number of random access MTC devices in the next frame is smaller or greater than the maximum number of RAOs capable of being allocated by the base station, determine the number of RAOs in the next frame and an access control probability in the next frame; and
broadcast system information, via a broadcast element, for the next frame, in which information corresponding to the number of RAOs in the next frame and the access control probability in the next frame is included.

14. The apparatus of claim 13, wherein the processor is configured to determine the at least one of the amount of resources to be allocated in the next frame and the access control probability in the next frame based on parameters which comprise the maximum number of RAOs capable of being allocated by the base station, the number of RAOs in the next frame, and the total number of random access MTC devices in the next frame.

15. The apparatus of claim 14, wherein, in a case where the total number of random access MTC devices in the next frame is smaller than or equal to the maximum number of RAOs capable of being allocated by the base station, the processor determines the access control probability in the next frame to be 1, and
wherein, in a case where a set of number of RAOs satisfying an average random access delay requirement of a random access MTC device is a null set, the processor determines the number of RAOs in the next frame to be the total number of random access MTC devices in the next frame, while, in any other cases, the processor determines the number of RAOs in the next frame to be a number of RAOs maximizing random access efficiency in the next frame.

16. The apparatus of claim 14, wherein, in a case where the total number of random access MTC devices in the next frame is greater than the maximum number of RAOs capable of being allocated by the base station, the processor determines the number of RAOs in the next frame to be the maximum number of RAOs, and
wherein, in a case where a set of access control probabilities satisfying a random access delay requirement is a null set, the processor determines the access control probability in the next frame to be a ratio of the maximum number of RAOs to the total number of random access MTC devices in the next frame, and, in any other cases, the processor determines the access control probability in the next frame to be an access control probability maximizing random access efficiency in the next frame.

17. The apparatus of claim 9, further comprising:
a preamble receiver configured to receive a preamble from an MTC device.

18. A base station device performing random access control for at least one device for optimization of random access efficiency of the wireless communication system, comprising:
a processor configured to:
estimate, based on a calculated probability of occurrence of idle devices in a current frame, a number of competitive devices attempting access in the current frame;
estimate a total number of random access devices in a next frame based on the estimated number of competitive devices in the current frame and an access control probability used in the current frame; and
determine at least one an access control probability in the next frame and an amount of resources to be allocated in the next frame according to an amount of resources required to satisfy a random access delay requirement, by considering both of access control and resource allocation based on the estimated total number of devices.

* * * * *